United States Patent
Crain et al.

(10) Patent No.: US 7,259,861 B1
(45) Date of Patent: Aug. 21, 2007

(54) USING A FIXED-FREQUENCY OF OSCILLATION IN AN FTS SYSTEM TO MEASURE SCENE INHOMOGENEITY

(75) Inventors: David James Crain, Grabill, IN (US); Douglas L. Cohen, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 415 days.

(21) Appl. No.: 10/959,941

(22) Filed: Oct. 6, 2004

(51) Int. Cl.
*G01B 9/02* (2006.01)

(52) U.S. Cl. .................................. 356/451

(58) Field of Classification Search ............. 356/450, 356/451, 452
See application file for complete search history.

(56) References Cited

U.S. PATENT DOCUMENTS

| | | |
|---|---|---|
| 5,621,526 A | 4/1997 | Kuze |
| 6,297,504 B1 | 10/2001 | Andreou |

OTHER PUBLICATIONS

Choongyeun Cho et al., "Stochastic Cloud Clearing of Hyperspectral Radiances Observed by the Atomspheric Infrared Sounder (AIRS) on the Aqua Satellite", Massachusetts Institute of Technology, Research Laboratory Electronics (2004).

James B. Abshire et al., "Laser Sounder Approach Measuring Atomspheric CO2 from Orbit", NASA Goddard Space Flight Center, pp. 1-6 (2003).

*Primary Examiner*—Tarifur Chowdhury
*Assistant Examiner*—Marissa J. Detschel
(74) *Attorney, Agent, or Firm*—RatnerPrestia

(57) ABSTRACT

A method for measuring scene inhomogeneity includes directing radiance of a scene into an interferometer; and oscillating a field-of-view (FOV) of the interferometer, while directing the radiance of the scene into the interferometer. A Fourier transform of signals emerging from the interferometer is obtained with magnitude values of the Fourier transform as a function of wavelength. The magnitude values are separated into (1) component values occurring within a predetermined wavelength band of the interferometer and (2) a component value occurring outside the predetermined wavelength band. The component value occurring outside the predetermined wavelength band is used to measure scene inhomogeneity.

21 Claims, 6 Drawing Sheets

US 7,259,861 B1

USING A FIXED-FREQUENCY OF OSCILLATION IN AN FTS SYSTEM TO MEASURE SCENE INHOMOGENEITY

TECHNICAL FIELD

The present invention relates, in general, to a method and apparatus for observation of atmospheric spectra or scene spectral radiance. More specifically, the present invention relates to a method and apparatus for measuring scene inhomogeneity, by providing a fixed-frequency of oscillation on a field of view (FOV) of a Fourier transform spectrometer (FTS) system.

BACKGROUND OF THE INVENTION

Conventional FTS systems, based on Michelson interferometers, assume that the radiance of a scene does not vary while the interferogram is being recorded. If the scene radiance does vary, however, as the line of sight (LOS) of the system changes for an inhomogeneous scene, then the radiance spectrum may not be accurate. If the LOS change is random, scene inhomogeity may become a significant contributor to the spectral measurement noise.

In meteorological sounding applications that use FTS systems, the scene inhomogeneity caused by the presence of clouds is a significant source of noise and uncertainty, when trying to measure cloud-free radiances. Conventional retrieval algorithms attempt to remove inhomogeneity by using methods, such as "cloud clearing", "hole hunting," or other cloud-masking techniques. None of these methods, however, is able unambiguously to determine the degree of scene inhomogeneity for an individual, or single field of view (FOV) of an FTS system. These FTS systems typically require observations of multiple or adjacent fields-of-view. As a general rule, these observations require a longer period of processing time and more processing throughput.

The deficiencies of conventional methods used to determine the degree of scene inhomogeneity, during observations by FTS systems, show that a need still exists for a method and system which can determine or measure the degree of scene inhomogeneity, using an observation from a single FOV of an FTS system. Eliminating measurements that include scene inhomogeneity could significantly improve the accuracy of sounding algorithms used to retrieve atmospheric parameters of interest. Furthermore, simply knowing that a FOV contains a homogeneous scene permits distinguishing between errors due to scene inhomogeneity and other uncontrollable, or random LOS changes on the measured spectra. The present invention addresses these deficiencies and concerns.

SUMMARY OF THE INVENTION

To meet this and other needs, and in view of its purposes, the present invention provides a method for measuring scene inhomogeneity including the steps of directing radiance of a scene into an interferometer; and oscillating a field of view (FOV) of the interferometer, while directing the radiance of the scene into the interferometer. The method also includes obtaining a Fourier transform of signals emerging from the interferometer; obtaining magnitude values of the Fourier transform as a function of wavelength; and separating the magnitude values into (1) component values occurring within a predetermined wavelength band of the interferometer and (2) a component value occurring outside the predetermined wavelength band.

The method of the invention uses the component value occurring outside the predetermined wavelength band to measure scene inhomogeneity. The FOV of the interferometer is oscillated according to a sinusoidal function of time, such as $$n(t) = A \sin(2\pi f_0 t)$$

where n is the oscillation component of the FOV in radians, $f_0$ is the frequency of oscillation, and A is the magnitude of the oscillation. The magnitude A is approximately between 0.5% and 10% of the FOV radius. The frequency of oscillation is $f_0 = u\sigma_0$, where u is the time rate of change of the optical path difference (OPD) imposed on beams traveling through the interferometer, and $\sigma_0$ is a wavenumber. The predetermined wavelength band of the interferometer is between $\sigma_{min}$ and max $\sigma_{max}$, and the FOV is oscillated at the frequency of $f_0 = u\sigma_0$ wherein c is less than $\sigma_{min}$ or greater than $\sigma_{max}$.

The method judges that the scene is inhomogeneous if the component value occurring outside the predetermined wavelength band is larger than a predetermined threshold value; and the method judges that the scene is homogeneous if the component value occurring outside the predetermined wavelength band is smaller than another predetermined value.

Another embodiment of the invention includes a method for measuring scene inhomogeneity. The method has the steps of: (a) directing radiance of a scene into an interferometer; (b) oscillating a field of view (FOV) of the interferometer, while directing the radiance of the scene into the interferometer; (c) obtaining a Fourier transform of signals emerging from the interferometer; (d) separating the Fourier transform into a real component and an imaginary component; and (e) using the imaginary component obtained in step (d) to measure scene inhomogeneity.

The frequency of oscillation of the FOV is $f_0 = u\sigma_0$, where u is the time rate of change of the optical path difference (OPD) imposed on beams traveling through the interferometer, and $\sigma_0$ is a wavenumber. The predetermined wavelength band of the interferometer is between $\sigma_{min}$ and $\sigma_{max}$, and the FOV is oscillated at the frequency of $f_0 = u\sigma_0$ wherein $$f_0 \geq u \cdot \left(\frac{\sigma_{max} - \sigma_{min}}{2}\right).$$

A method of the invention may include oscillating the FOV at a frequency of oscillation and controlling a phase of the frequency of oscillation, and obtaining the imaginary component of the Fourier transform, while controlling the phase and frequency of the oscillation of the FOV.

Yet another embodiment of the invention includes a system for measuring scene inhomogeneity. The system includes an interferometer having a field-of-view (FOV) for receiving radiance from a scene and providing output signals based on the received radiance. An oscillator is coupled to the interferometer for oscillating the FOV, and a processor is coupled to the interferometer for calculating a Fourier transform of the output signals emerging from the interferometer. The processor measures scene inhomogeneity based on the oscillating FOV. The system may also include a phase controller coupled between the interferometer and the oscillator for controlling phase of the oscillating FOV.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

As will be explained, the present invention places a small, uniform oscillation on the FOV of a Michelson interferometer. The interferometer of the invention observes a scene with the oscillating FOV. If the interferometer observes a scene which is inhomogeneous at the edges of the FOV, for example, then the frequency spectrum of the interferometer signal (in addition to the desired in-band spectra from the scene) includes a non-zero impulse that is proportional to the degree of scene inhomogeneity.

When this non-zero impulse is small or undetectable, then the scene is only slightly inhomogeneous. This, in turn, likely indicates that the scene is cloud-free or covered by the same type of cloud layer. If the opposite is determined, however, then the scene is likely inhomogeneous and probably has a relatively large fraction of the FOV filled with different types of cloud or other sources of distinct radiance spectra.

By controlling the frequency of the oscillation, the present invention advantageously arranges for the non-zero impulse to occur at an out-of-band wavenumber (or frequency) of the radiance measurement. The present invention may also control the phase of the oscillation, thereby placing the non-zero impulse in quadrature to the interferometer signal channel that contains the scene radiance. This advantageously prevents the oscillation, no matter what its frequency or frequencies happen to be, from contaminating the radiance measurements.

Figure 1:
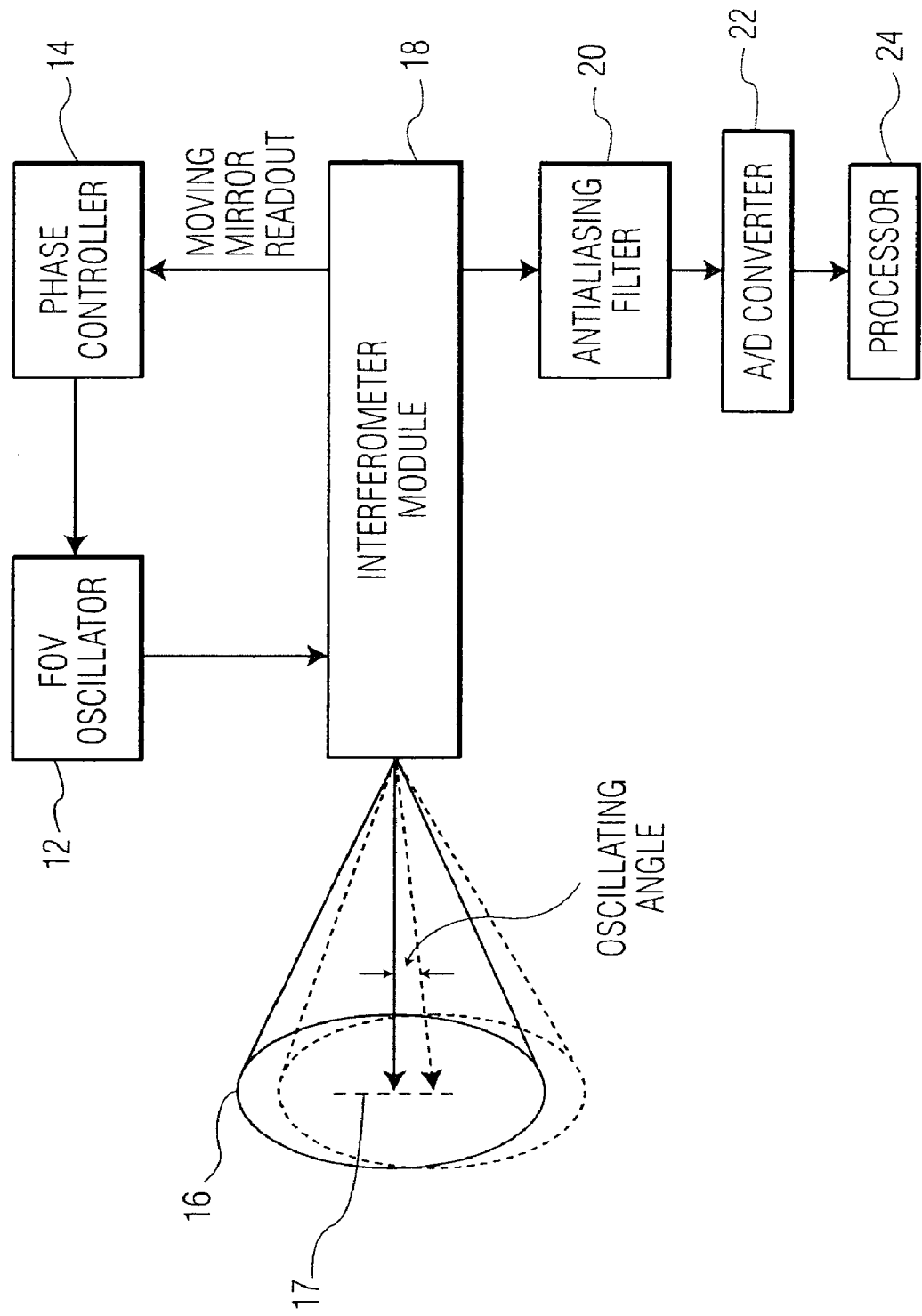
FIG. 1 is a block diagram of a system for measuring scene inhomogeneity by imposing a fixed frequency oscillation to a field-of-view (FOV) of an interferometer, in accordance with an embodiment of the invention.

Turning now to FIG. 1, there is shown a system for measuring scene inhomogeneity, generally designated as 10. As shown, system 10 includes a Michelson interferometer module 18 including field of view (FOV) 16, which is oscillating at a predetermined fixed frequency of oscillation. The oscillation may vary sinusoidally along one dimension, for example, along line 17. Along line 17, the oscillation forms an oscillating angle, as shown. The oscillation frequency may be controlled by FOV oscillator 12 and the phase of oscillation may be controlled by phase controller 14. The phase controller may read a moving mirror readout signal from interferometer module 18 that indicates the position of the moving mirror. Using the readout signal, phase controller 14 may control the phase of oscillation produced by FOV oscillator 12.

The output signal from interferometer module 18 may be provided to processor 24 by way of anti aliasing filter 20 and analog-to-digital (A/D) converter 22. Processor 24 provides the calculations for measuring the scene inhomogeneity by calculating, as explained below, the in-phase signals, or the quadrature signals, or both the in-phase and quadrature signals.

Figure 2:
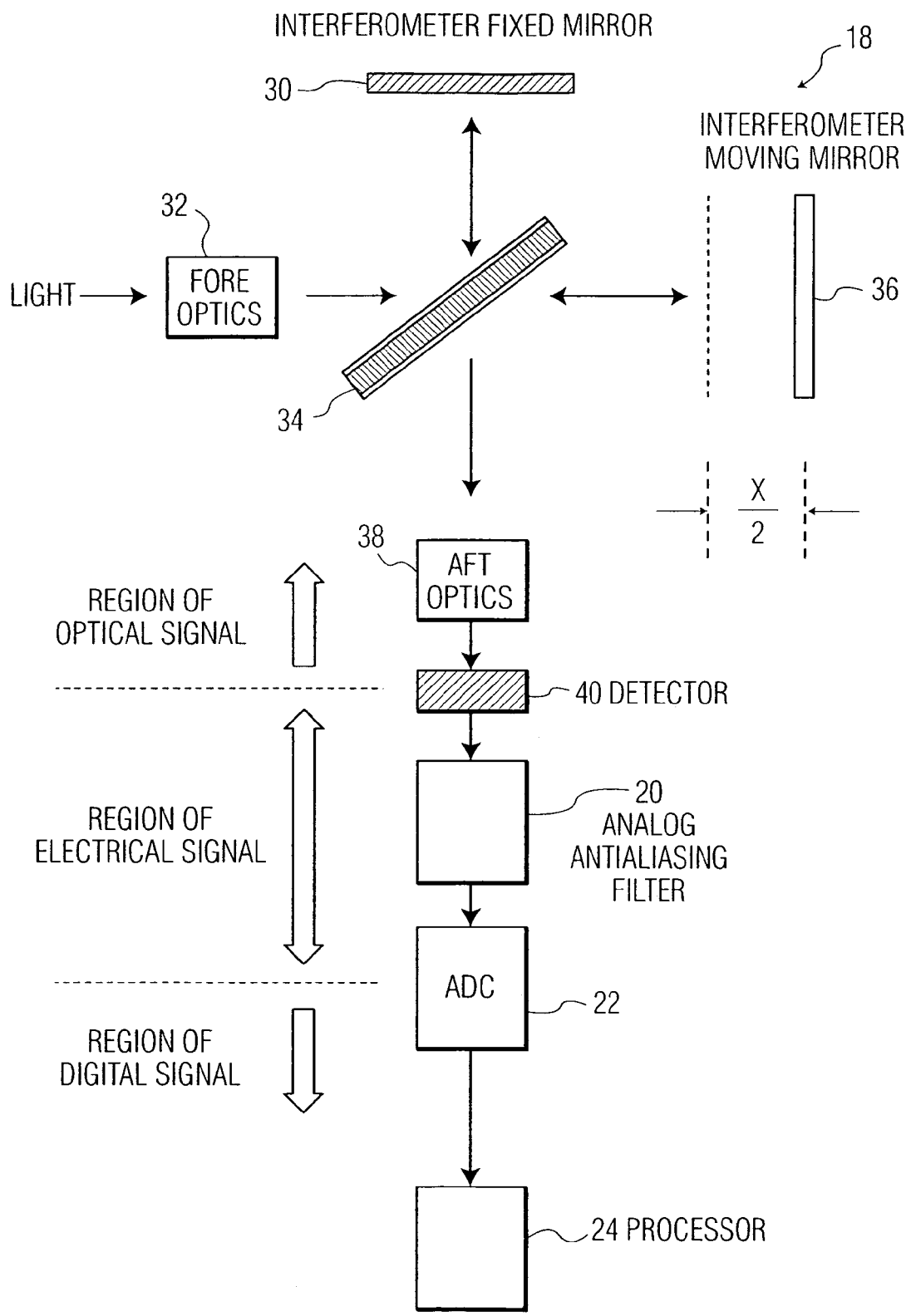
FIG. 2 is a schematic block diagram depicting a path of light radiating into the interferometer of FIG. 1, which is then detected and processed, in accordance with an embodiment of the present invention.

A more detailed block diagram of interferometer module 18 is shown in FIG. 2. As shown, interferometer module 18 includes fore optics 32, aft optics 38, interferometer fixed mirror 30, beam splitter 34, moving mirror 36 and detector 40. Incident light from a subject of observation (typically a scene viewed from an aircraft or satellite) is input into fore optics 32, which is separated by beam splitter 34 into two beams directed to fixed mirror 30 and moving mirror 36. The two beams are then reflected by these respective mirrors back to the beam splitter, recombined and sent toward detector 40, by way of aft optics 38. Detector 40 may be a single detector or a focal planar array of detectors.

The interferometer moving mirror moves a distance of $\chi/2$, as shown in FIG. 2. The distance of $\chi$ corresponds to the optical path difference (OPD) imposed on the beams as they travel through the interferometer. The OPD value of $\chi$ corresponds to a physical shift of the moving mirror of $\chi/2$. The mirror moves within a range of $\pm D/2$ of the dotted line which corresponds to the zero path difference (ZPD) position of the moving mirror.

As also shown in FIG. 2, the output from detector 40 is provided to processor 24 by way of analog anti aliasing filter 20 and analog-to-digital converter (ADC) 22, which samples the signal from the interferometer at equally spaced values.

It will be appreciated that the oscillating FOV 16, shown in FIG. 1, may be implemented in several different ways each resulting in interferometer 18 having the oscillating FOV. For example, fore optics 32 may include an oscillating element (not shown) that imparts oscillation to the incoming light beam. As another example, any one of fixed mirror 30, beam splitter 34, or moving mirror 36 may be tilted back and forth, so as to produce a sinusoidal oscillation in the FOV shown in FIG. 1.

One embodiment of the invention, as shown in FIG. 1, oscillates the FOV in one dimension along line 17 (for example). In another embodiment, as explained below, the oscillation may be provided along line 17 (for example) during one measurement of the scene spectra; and during the next measurement of the scene, the oscillation may be provided along another line (omitted for clarity) that is perpendicular to line 17. In this manner, two dimensions of oscillation may be provided, although not simultaneously. In yet another embodiment of the invention, the oscillation may be circular in nature (explained below), thereby imparting simultaneously a two dimensional motion to the oscillation.

The invention will now be described by using a mathematical model for a FTS system based on the Michelson interferometer. The effect of adding a deterministic oscillation to the LOS or FOV of the interferometer, while observing an inhomogeneous scene, will also be described mathematically.

Figure 3:
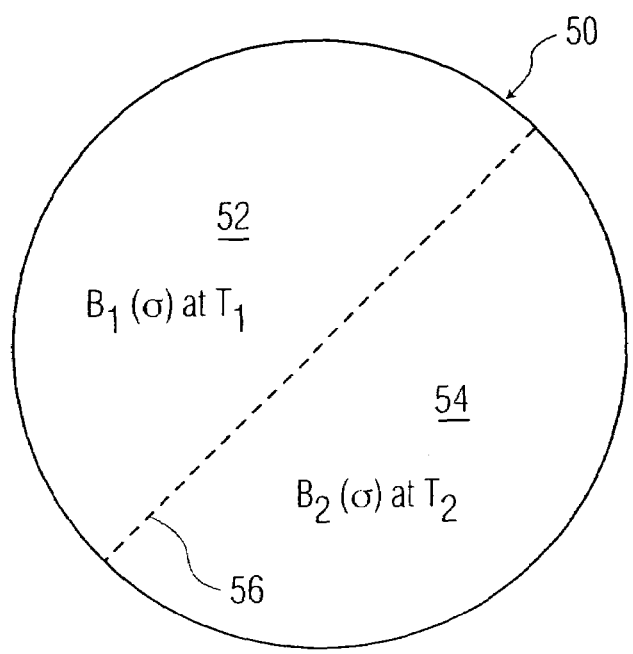
FIG. 3 depicts a FOV of an interferometer bounded by a circle and bisected by a virtual diameter to form two sides, where each side is defined by a black body spectrum, in accordance with an embodiment of the present invention.

The interferometer may include a circular FOV of angular radius S, as shown in FIG. 3. As shown, the FOV is bounded by circle 50 and bisected by a virtual diameter, generally designated as 56. Sides 52 and 54 of the bisected circle may be defined by $B_1(\sigma)$ and $B_2(\sigma)$ which are the black-body spectra coming from each side of the FOV, with $\sigma$ being the wavenumber argument and $T_{1,2}$ being the respective black-body temperatures for the $B_{1,2}$ radiances. Temperature $T_1$ may be assumed to be larger than temperature $T_2$.

The $B_{1,2}$ radiances of sides 52 and 54, respectively, may be used to define $$\Delta L(\sigma) = \frac{2}{\pi S}[B_1(|\sigma|) - B_2(|\sigma|)] \quad (1a)$$

The Planck black-body radiance at temperature T is $$B(|\sigma|, T) = \frac{C_1|\sigma|^3}{e^{C_2|\sigma|/T} - 1} \quad (1b)$$

where $C_1 \cong 1.191 \times 10^{-5}$ (erg/sec)/sr/cm$^{-2}$ and $C_2 \cong 1.4388$ cm$^2$degK. This may be rewritten as $$B_{1,2}(\sigma) = B(|\sigma|, T_{1,2}). \quad (1c)$$

The factor of $2/(\pi S)$ in equation (1a) comes from the ratio of the diameter to the area of the circular FOV which is bisected into two different radiance regions.

The optics shaping the input beam before the beam encounters the interferometer's beamsplitter, for example fore optics 32 of FIG. 2, have a collective transmission of $\tau_f(|\sigma|)$. The optics carrying the beam from the interferometer to the detector, for example aft optics 38 of FIG. 2, have a collective transmission of $\tau_a(|\sigma|)$. The interferometer's beamsplitter (for example 34 of FIG. 2) may have an efficiency value expressed as $\eta(|\sigma|)$.

It will be appreciated that the values of $\tau_f$, $\sigma_a$, and $\eta$ are dimensionless numbers between zero and one, as they vary with $\sigma$. In good instruments, $\tau_f$, $\tau_a$, and $\eta$ usually have values between one half and one for the $\sigma$ values being measured.

The area of the FTS entrance aperture is $A_{ap}$, and $$\Omega_{fov} = \pi S^2$$

is the total solid angle of the FOV. The detector (for example 40 in FIG. 2) receiving the optical interference signal from the aft optics has a responsivity of $R(|\sigma|)$.

The radiance entering the interferometer is split into two different beams by the beamsplitter, and these beams recombine later to form the exit beam at the detector. The optical-path difference (OPD) imposed on these two beams, as the beams travel through the interferometer is called $\chi$. The steady motion of the interferometer's moving mirror (for example 36 in FIG. 2) means that $\chi$ and the time argument t of the detector signal may be related by $$\chi = ut \quad (2a)$$

where u is the time rate of change of the OPD, often referred to as the OPD velocity. The distance actually moved by the interferometer moving mirror 36 is one half of $\chi$, as shown in FIG. 2, for example.

In addition, the frequency f of the detector signal is related to the wavenumber $\sigma$ of the beam radiance passing through the interferometer by $$f = u\sigma \quad (2b)$$

As will become clear later, it is useful to now define the convolution of two functions $u(\sigma)$ and $v(\sigma)$ to be $$u(\sigma) * v(\sigma) = \int_{-\infty}^{\infty} u(\sigma')v(\sigma - \sigma')d\sigma'. \quad (3)$$

A complex Fourier transform of the signal leaving the interferometer's detector may be written as a function of either the frequency f or the wavenumber $\sigma$, because these two parameters are proportional to each other (see equation (2b)).

The in-phase component of the complex Fourier transform may be defined as that part of the Fourier transform containing the spectral radiance that the interferometer is measuring. In an ideal interferometer, this is always the real part of the signal's complex Fourier transform. Even in a non-ideal interferometer, the Fourier transform of the detector signal may be processed (by processor 24, for example) so that the in-phase channel is strictly real.

After this processing is done, the Fourier-transform component Z generated by the invention's imposed LOS oscillation may be written as $$Z(\sigma) = \kappa N_D(\sigma) + N_D(\sigma) * \Delta Z(\sigma) \quad (4a)$$

where $$\Delta Z(\sigma) = \frac{A_{ap}\Omega_{fov}}{4}\eta(|\sigma|)\tau_a(|\sigma|)\tau_f(|\sigma|)R(|\sigma|)\Delta L(|\sigma|) \quad (4b)$$

and $$\kappa = \int_{-\infty}^{\infty} \Delta Z(\sigma) d\sigma. \quad (4c)$$

It will be understood that $\Delta Z$ must be zero for those wavenumbers $\sigma$ at which $\tau_a(|\sigma|)$ or $R(|\sigma|)$ are zero. The $N_D(\sigma)$ Fourier transform comes from n(t), the time-changing angular component of the oscillation in the LOS, as shown in FIG. 1, which is perpendicular to the boundary between radiances $B_1$ and $B_2$. The units of n are radians, and n may be expressed as a function of either t or $\chi$ because the two are proportional (see equation (2a)).

In order to obtain $N_D(\sigma)$, the value of n is expressed as a function of $\chi$, and the following may be written $$N_D(\sigma) = \int_{-D}^{D} n(\chi)e^{-2\pi i\sigma\chi}d\chi. \quad (4d)$$

The expression of $N_D$ has units of radian·cm=radian/cm$^{-1}$ when $\chi$ has units of cm and C has units of cm$^{-1}$. Parameter D specifies the range of $\chi$ over which the signal leaving the interferometer's detector is recorded. That is, the range must be $$-D \leq \chi \leq D. \quad (4e)$$

The resolution of the FTS may be expressed as $$\Delta\sigma = \frac{1}{2D} \quad (4f)$$

which is the unapodized spectral resolution of the FTS. Hence, by knowing $\Delta\sigma$, the value of D may be found by calculating $$D = \frac{1}{2\Delta\sigma}.$$

Following the convention that the in-phase component of the detector signal has a strictly real Fourier transform, the invention provides that the oscillation of n as a function of t is $$n(t) = A \sin(2\pi f_0 t)$$

for some frequency $f_0$. Equations (2a,b) then show how to write the oscillation n as a function of $\chi$:

$$n(\chi) = A \sin(2\pi\sigma_0\chi) \quad (5a)$$

where $$\sigma_0 = \frac{f_0}{u}. \quad (5b)$$

Substituting this into equation (4d) gives $$N_D(\sigma) = ADi[\sin c(2\pi D(\sigma+\sigma_0)) - \sin c(2\pi D(\sigma-\sigma_0))] \quad (5c)$$

where in equation (5c) the following is defined:

$$\sin c(x) = \frac{\sin(x)}{x}. \quad (5d)$$

It will be understood that $N_D$ is a purely imaginary quantity. Since the in-phase signal channel is taken to be strictly real, the invention expects that Z is purely imaginary to show that it belongs to the signal's quadrature channel. Checking equations (4b,c) and the right-hand side of equation (4a), it may be seen that both $\Delta Z$ and $\kappa$ are strictly real, making Z purely imaginary when $N_D$ is purely imaginary. Hence, this imaginary $N_D$ produces a Z signal component which is expected to be in quadrature with respect to the interferometer's radiance measurements.

Substituting the formula for $N_D$ in equation (5c) into the formula for Z in equation (4a) produces the formula for the signal component generated by the controlled LOS oscillation of the invention:

$$Z(\sigma) = i\{AD\kappa \sin c(2\pi D(\sigma+\sigma_0)) - AD\kappa \sin c(2\pi D(\sigma-\sigma_0))\} + i\{AD[\sin c(2\pi D(\sigma+\sigma_0))]^*\Delta Z(\sigma) - AD[\sin c(2\pi D(\sigma-\sigma_0))]^*\Delta Z(\sigma)\} \quad (6)$$

The terms inside the first pair of braces { } in equation (6) represent two signal impulses at wavenumbers $\pm f_0$ that, according to equation (2b), correspond to frequencies $\pm f_0 = \pm u\sigma_0$.

The signal impulse at wavenumber $\sigma_0$ is also the scene-inhomogeneity (SI) impulse of the invention. The SI impulse may easily be observed, if the SI impulse lies well above the expected noise level in the quadrature channel of the interferometer signal.

Typically, interferometers have the same amount of noise in both the in-phase channel and quadrature channel. Accordingly, the invention uses the in-phase channel's noise amplitude to estimate the quadrature channel's noise amplitude.

Figure 4:
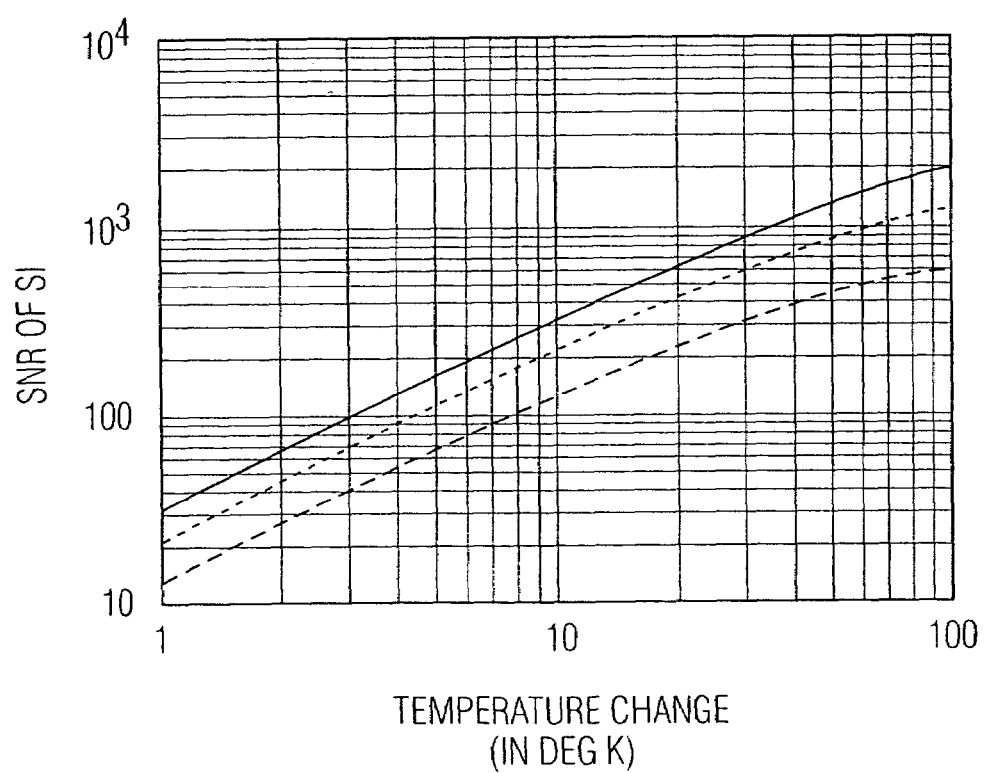
FIG. 4 depicts three curves of signal-to-noise ratio (SNR) of an impulse function SI caused by inhomogeneity of an observed scene versus temperature change between the two black body scene radiances emitted from the respective sides shown in FIG. 3, in accordance with an embodiment of the present invention.

As an example, the measured noise amplitude of a longwave in-phase channel of a typical state-of-the-art interferometer may be used as a value for the quadrature noise. FIG. 4 exemplifies the signal-to-noise ratio (SNR) of the SI impulse as a function of the temperature difference (or change) between the two black-body scene radiances emitted from the two sides shown in FIG. 3. The size A of the oscillation, used to obtain the results of FIG. 4, is 0.5% of the FOV radius for a typical state-of-the-art interferometer. Of course, another oscillation size may also have been used. The values used for D, as well as the other parameters needed to calculate K, correspond to a typical state-of-the-art interferometer for the long-wave IR band.

The three curves shown in FIG. 4 correspond to three different values of the hotter scene temperature T. The solid curve shows the SNR for $T_1$ at 300 is degrees K. The dotted curve shows the SNR for $T_1$ at 260 degrees K, and the dashed curve shows the SNR for $T_1$ at 220 degrees K.

Examining these curves, it is apparent that there is no difficulty detecting the inhomogeneity of a bisected scene, even when the temperature difference between each side is only 1 degree K. Since the smallest plotted value of the SNR is still greater than 10, there is also plenty of margin to handle those cases where the imposed oscillation is not exactly perpendicular to the boundary between radiances $B_1$ and $B_2$.

Figure 5:
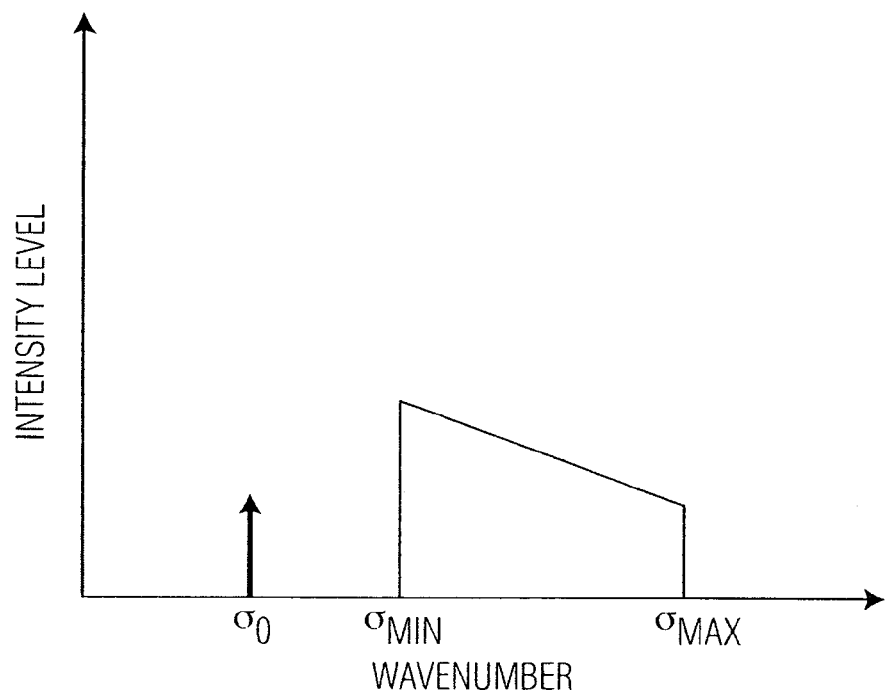
FIG. 5 is an exemplary plot of intensity level as a function of wavenumber, showing radiance measurements obtained from an in-band spectrum of an interferometer observing a scene and the impulse function SI caused by inhomogeneity of the observed scene, in accordance with an embodiment of the present invention.

So far no choice has been specified for the frequency $f_0 = u\sigma_0$ at which the LOS oscillation occurs. Given that the interferometer's radiance measurement occurs over a band between minimum and maximum wavenumbers $\sigma_{min}$ and $\sigma_{max}$, the present invention may choose $\sigma_0 < \sigma_{min}$ or $\sigma_0 > \sigma_{max}$ so that the SI impulse most likely would not affect the radiance measurement when, perhaps unintentionally, an in-phase signal component is generated. An example of the SI impulse occurring at $\sigma_0$ which is smaller than $\sigma_{min}$ is shown in FIG. 5.

Another measurement may be made by the invention, after specifying a proper choice for $f_0 = u\sigma_0$ in equation (6).

Note that the second term inside braces { } on the right-hand side of equation (6) may be approximated as $$i\left\{\frac{A}{2}[2D\text{sinc}(2\pi D(\sigma + \sigma_0))] * \Delta Z(\sigma) - \frac{A}{2}\{2D\text{sinc}(2\pi D(\sigma - \sigma_0))] * \Delta Z(\sigma)\right\} \cong \quad (7a)$$

$$i\left\{\frac{A}{2}\Delta Z(\sigma + \sigma_0) - \frac{A}{2}\Delta Z(\sigma - \sigma_0)\right\}$$

where the two sinc functions may be treated like delta functions $$2D \sin c(2\pi D(\sigma \pm \sigma_0)) \cong \delta(\sigma \pm \sigma_0). \quad (7b)$$

These two sinc functions may be treated as shown in equation (7b), because they oscillate very rapidly, with a large and narrow peak at a $\sigma = \pm \sigma_0$, compared to the relatively slow variation of $\Delta Z$ with respect to $\sigma$. Because the radiance is not measured by the interferometer outside the wavenumber band between $\sigma_{min}$ and $\sigma_{max}$, the invention expects that $\Delta Z(\sigma)$ is negligible or zero, unless $$\sigma_{min} \leq |\sigma| \leq \sigma_{max}.$$

This does not happen because the radiance entering the interferometer is small unless $\sigma_{min} \leq |\sigma| \leq \sigma_{max}$ but, rather, because the interferometer provides that the product of $\eta(|\sigma|)\tau_a(|\sigma|)\tau_f(|\sigma|)R(|\sigma|)$ in equation (4b) is negligible or zero, unless $\sigma_{min} \leq |\sigma| \leq \sigma_{max}$. Equation (7a) then shows that the two wavenumber regions overlap, where $\Delta Z(\sigma - \sigma_0)$ and $\Delta Z(\sigma + \sigma_0)$ are both non-negligible, unless $$\sigma_{min} + \sigma_0 \geq \sigma_{max} - \sigma_0$$

or, applying equation (2b), $$f_0 \geq u \cdot \left(\frac{\sigma_{max} - \sigma_{min}}{2}\right). \quad (7c)$$

If $f_0 = u\sigma_0$ is chosen so that (7c) is satisfied, and if the signal from the LOS oscillation is entirely confined to the quadrature channel so that it does not contaminate the in-phase measurement of the scene radiance, then the present invention may detect the $\Delta Z$ signal component, as long as the $\Delta Z$ signal component exceeds the noise in the quadrature channel.

Accordingly, the invention advantageously may simultaneously measure both $\Delta Z$ and the FOV average scene radiance, thus providing information to determine the shapes (but not the magnitudes) of the scene radiances from both regions or sides of the FOV.

Figure 6:
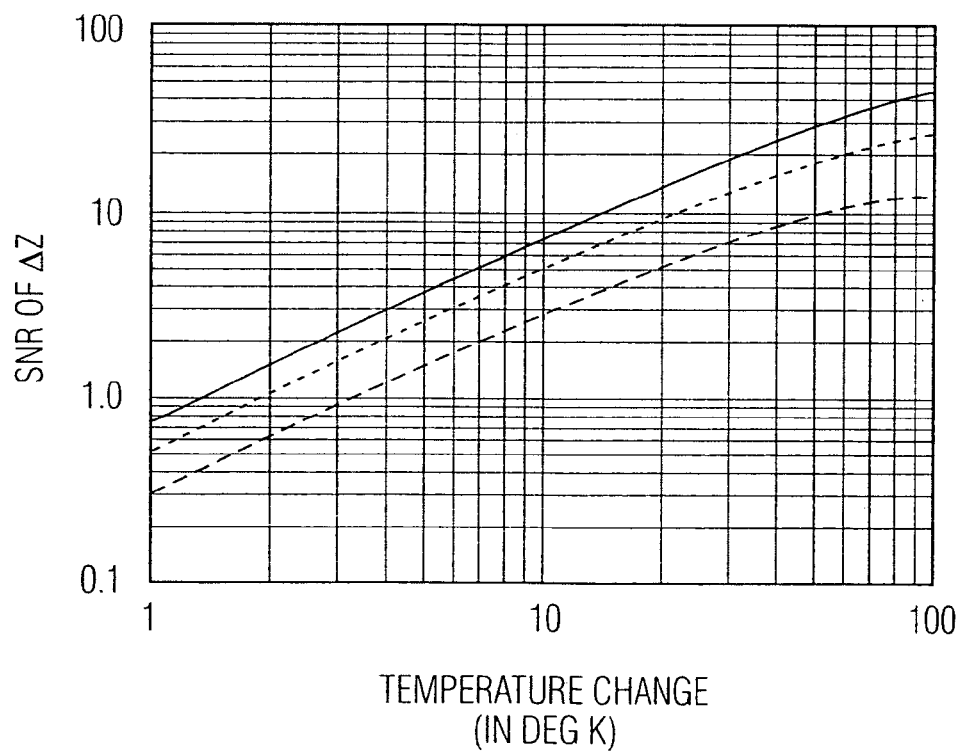
FIG. 6 is a plot of three curves showing signal-to-noise ratio (SNR) of a signal component $\Delta Z$ caused by inhomogeneity of an observed scene versus temperature change between the two black body scene radiances emitted from the respective sides shown in FIG. 3, in accordance with an embodiment of the present invention.

FIG. 6 shows the average SNR for this $\Delta Z$ signal component using a setup that is similar to the setup used to obtain FIG. 4. As shown, FIG. 6 exemplifies the signal-to-noise ratio (SNR) of the $\Delta Z$ signal component as a function of the temperature difference (or change) between the two blackbody scene radiances emitted from the two sides shown in FIG. 3. The size A of the oscillation used to obtain the results of FIG. 6 is 10% of the FOV radius for a typical state-of-the-art interferemeter, which is greater than the size of the oscillation used to obtain FIG. 4. (Of course, another oscillation size may also be used.)

The three curves shown in FIG. 6 correspond to three different values of the hotter scene temperature $T_1$. The solid curve shows the SNR for $T_1$ at 300 degrees K. The dotted curve shows the SNR for $T_1$ at 260 degrees K, and the dashed curve shows the SNR for $T_1$ at 220 degrees K.

With the amplitude of the oscillation now increased to 10% of the FOV radius, it may be apparent from FIG. 6 that as long as the temperature difference exceeds 10 degrees K (approximately), there likely is no difficulty for the invention to measure the $\Delta Z$ signal.

Although the mathematical model of the invention, as derived above, assumes that only two different temperature regions (or sides) exist inside the FOV (although this does often occur), when the FOV contains multiple regions with different radiances, the $\Delta Z$ signal of the invention does provide useful information about the effective spread in the shape of the scene radiances. For example, the spread of temperature (temperature change) across the FOV may be estimated from the $\Delta Z$ signal.

Figure 7:
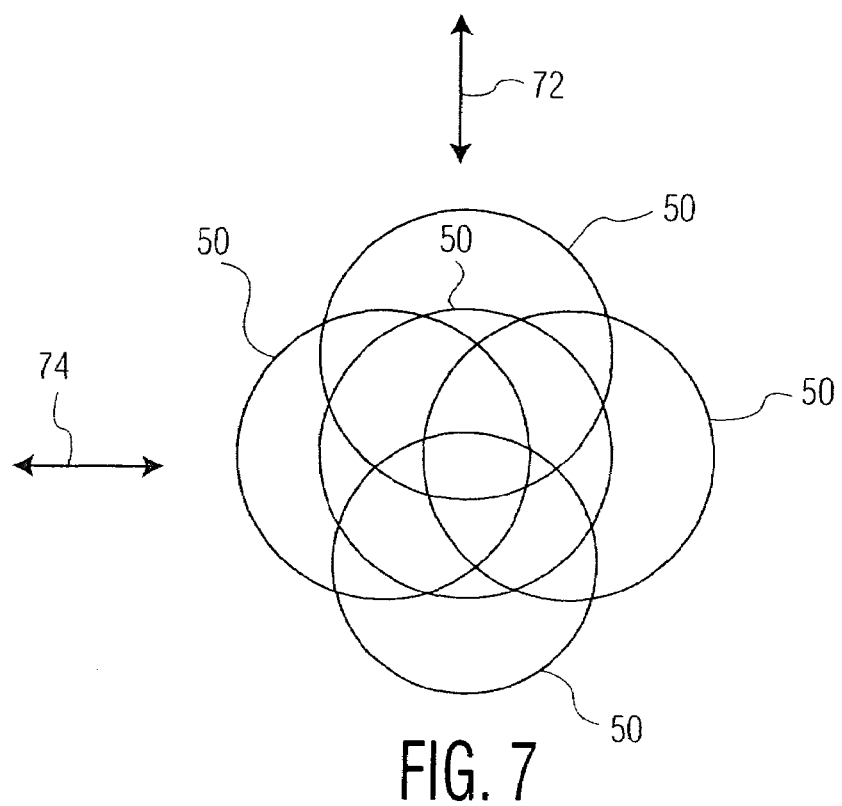
FIG. 7 is a pictorial schematic of an oscillating FOV of an interferometer, showing two dimensional oscillation, in accordance with an embodiment of the present invention.

As another embodiment of the invention, two perpendicular oscillations of the LOS may be imposed, where a first oscillation is provided along a first dimension and a second oscillation is provided along a second dimension perpendicular to the first dimension, as schematically shown in FIG. 7. As shown, the first oscillation of FOV 50 is provided along the first dimension, designated as 72 (for example), and the second oscillation of FOV 50 is provided along the second dimension, designated as 74 (for example). The first oscillation 72 is perpendicular to the second oscillation 74. Two scene measurements are also required, where the first scene measurement is processed during the first oscillation along the first dimension, and then the second scene measurement is processed during the second oscillation along the second dimension. By imposing two perpendicular oscillations of the LOS in two scene measurements, the invention may ensure that every orientation of the scene boundary or boundaries is detected.

Figure 8:
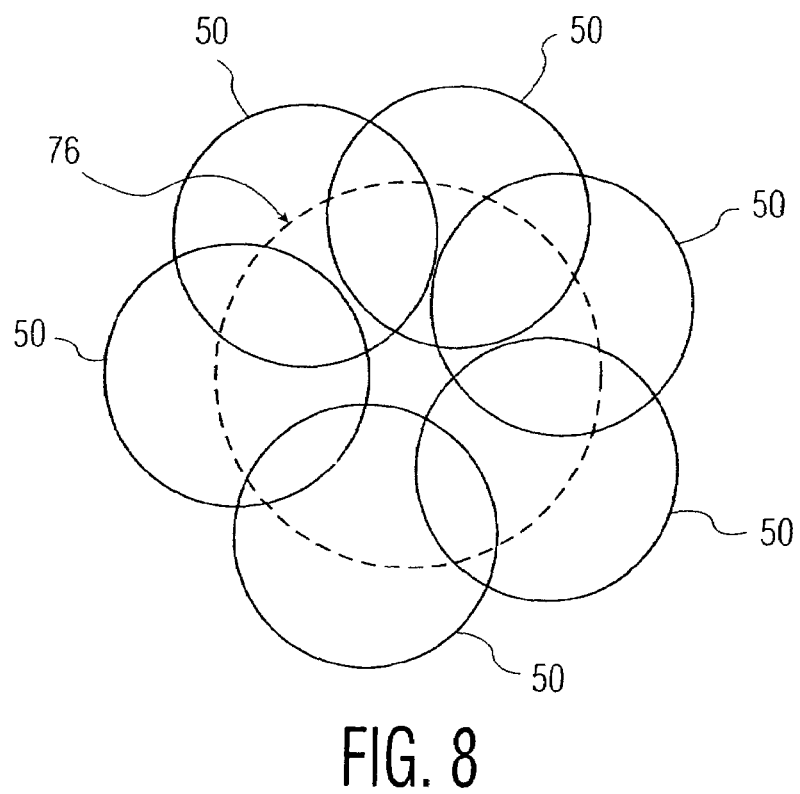
FIG. 8 is another exemplary embodiment of the present invention showing a FOV oscillated in a circular manner.

As yet another embodiment of the invention, a circular oscillation of the LOS may be imposed, as schematically shown in FIG. 8. As shown, FOV 50 is oscillated along the dashed circumference of circle 76. The circular oscillation of the LOS may detect any orientation of edge inhomogeneity in a single scene measurement. A disadvantage of the circular oscillation, however, is that the SI impulse is likely to reside in both the in-phase and quadrature channels of the interferometer.

Figure 9:
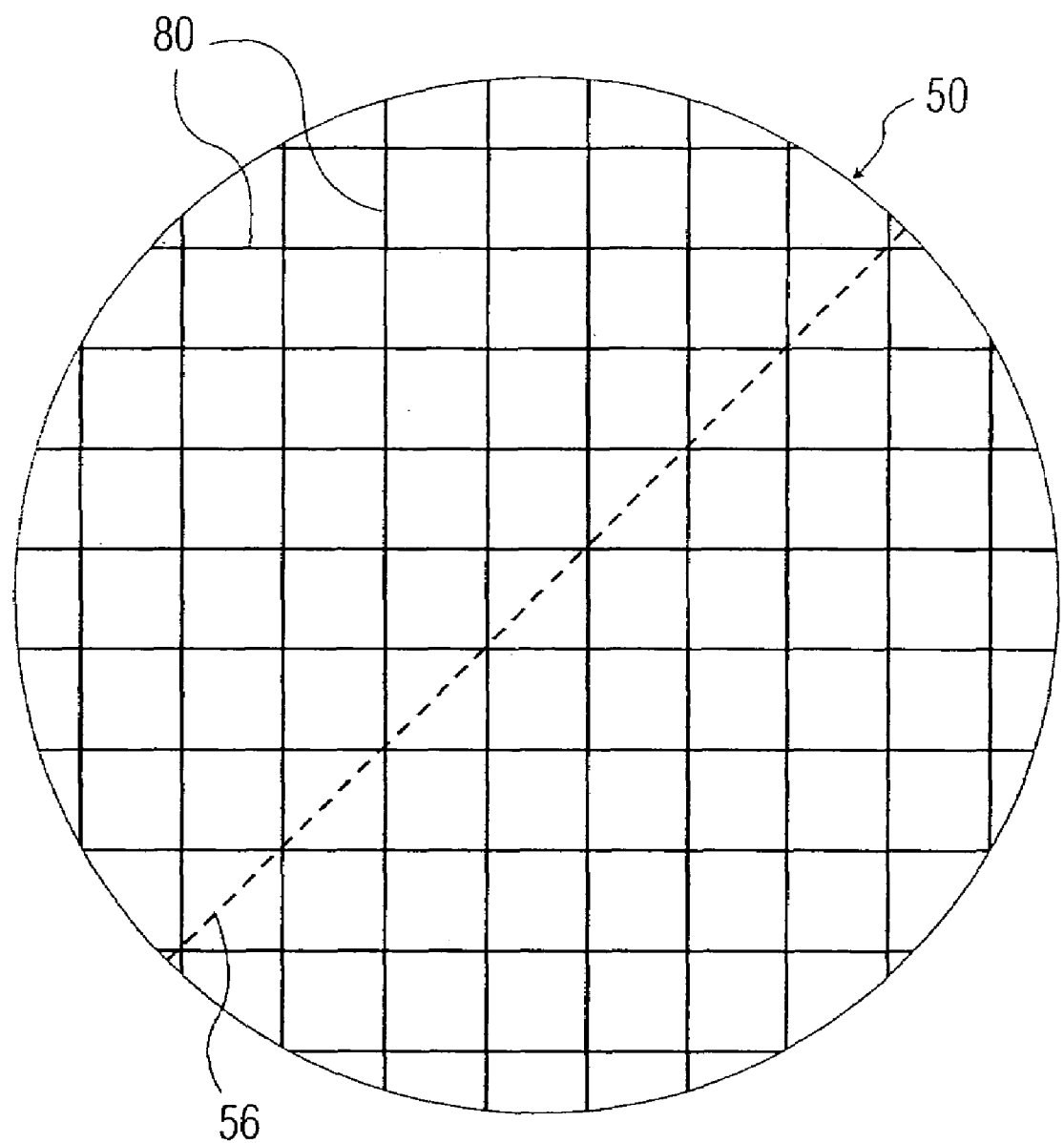
FIG. 9 is a pictorial of a FOV as imaged through a grid disposed in front of the interferometer shown in FIG. 1, in accordance with an embodiment of the present invention.

In still another embodiment of the invention, a grid is placed over the FOV, as schematically shown in FIG. 9. As shown, FOV 50 includes grid 72 placed at the front optics of the interferometer. It will be appreciated that the number of horizontal and vertical lines forming grid 72 may be less or greater than the 10 horizontal lines and the 10 vertical lines shown in FIG. 9. Placing a grid over the FOV adds more "edges," thus allowing the detection of scene inhomogeneity around the center of the FOV, while blocking insignificant amounts of the scene radiance.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method for measuring scene inhomogeneity comprising the steps of:
   (a) directing radiance of a scene into an interferometer;
   (b) oscillating a field of view (FOV) of the interferometer, while directing the radiance of the scene into the interferometer;

(c) obtaining a Fourier transform of signals emerging from the interferometer;

(d) obtaining magnitude values of the Fourier transform as a function of wavelength;

(e) separating the magnitude values into (1) component values occurring within a predetermined wavelength band of the interferometer and (2) a component value occurring outside the predetermined wavelength band;

(f) using the component value occurring outside the predetermined wavelength band to measure scene inhomogeneity; and (g) providing the measured scene inhomogeneity to a viewer.

2. The method of claim 1 wherein
step (b) includes uniformly changing an angular component of line-of-sight (LOS) perpendicular to the radiance of the scene.

3. The method of claim 1 wherein
step (b) includes uniformly oscillating the FOV of the interferometer according to a sinusoidal function of time.

4. The method of claim 1 wherein
step (b) includes oscillating the FOV of the interferometer at a frequency $f_0$ and amplitude A.

5. The method of claim 4 wherein
A is approximately between 0.5% and 10% of the FOV radius.

6. The method of claim 4 wherein $$f_0 = u\sigma_0$$

u is time rate of change of an optical path difference (OPD) imposed on beams traveling through the interferometer, and $\sigma_0$ is a wavenumber.

7. The method of claim 6 wherein the predetermined wavelength band of the interferometer is between $\sigma_{min}$ and $\sigma_{max}$, where $\sigma_{min}$ and $\sigma_{max}$ are minimum and maximum wave numbers, respectively, and step (b) includes oscillating the FOV at a frequency of $f_0 = u\sigma_0$ wherein $\sigma_0$ is less than $\sigma_{min}$ or greater than $\sigma_{max}$.

8. The method of claim 6 wherein
step (e) includes placing the magnitude value of the component occurring outside the predetermined wavelength band at the wavenumber of $\sigma_0$.

9. The method of claim 1 wherein
step (f) includes judging that the scene is inhomogeneous if the component value occurring outside the predetermined wavelength band is larger than a predetermined threshold value, and judging that the scene is homogeneous if the component value occurring outside the predetermined wavelength band is smaller than another predetermined value.

10. The method of claim 1 wherein
step (a) includes directing the radiance of the scene from only a single FOV into the interferometer, and
using only the single FOV to measure the scene inhomogeneity.

11. A method for measuring scene inhomogeneity comprising the steps of:
(a) directing radiance of a scene into an interferometer;
(b) oscillating a field of view (FOV) of the interferometer, while directing the radiance of the scene into the interferometer;
(c) obtaining a Fourier transform of signals emerging from the interferometer;

(d) separating the Fourier transform into a real component and an imaginary component;

(e) using the imaginary component obtained in step (d) to measure scene inhomogeneity; and (f) providing the measured scene inhomogeneity to a viewer.

12. The method of claim 11 wherein
step (b) includes oscillating the FOV of the interferometer according to $$n(t) = A \sin(2\pi f_0 t)$$

wherein n is the oscillation component of the FOV in radians, $f_0$ is the frequency of oscillation, and A is the magnitude of the oscillation.

13. The method of claim 12 wherein $$f_0 = u\sigma_0$$

u is time rate of change of an optical path difference (OPD) imposed on beams traveling through the interferometer, and $\sigma_0$ is a wavenumber.

14. The method of claim 13 wherein the predetermined wavelength band of the interferometer is between $\sigma_{min}$ and $\sigma_{max}$, where $\sigma_{min}$ and $\sigma_{max}$ are minimum and maximum wave numbers, respectively, and step (b) includes oscillating the FOV at a frequency of $f_0 = u\sigma_0$ wherein $$f_0 \geq u \cdot \left(\frac{\sigma_{max} - \sigma_{min}}{2}\right).$$

15. The method of claim 11 wherein
step (b) includes oscillating the FOV at a frequency of oscillation and controlling a phase of the frequency of oscillation, and step (d) includes obtaining the imaginary component of the Fourier transform while controlling the phase of the frequency of oscillation of the FOV.

16. The method of claim 15 wherein
step (e) includes judging that the scene is inhomogeneous if a value of the imaginary component is larger than a predetermined threshold value, and judging that the scene is homogeneous if the value of the imaginary component is smaller than another predetermined value.

17. The method of claim 11 wherein
step (b) includes oscillating the FOV of the interferometer at a first direction along the scene during a first time interval, and oscillating the FOV of the interferometer at a second direction along the scene during a second time interval;

step (c) includes obtaining the Fourier transform of signals emerging from the interferometer during the first time interval and, next, during the second time interval; and step (e) includes measuring the scene inhomogeneity using the imaginary component obtained during the first time interval and, next, during the second time interval.

18. The method of claim 11 wherein
step (b) includes oscillating the FOV of the interferometer in a circular direction with respect to the scene.

19. The method of claim 11 wherein
step (a) includes placing a grid in front of the interferometer and directing the radiance of the scene into the interferometer by way of the grid.

20. A system for measuring scene inhomogeneity comprising
an interferometer including a field of view (FOV) for receiving radiance from a scene and providing output signals based on the received radiance,
an oscillator coupled to the interferometer for oscillating the FOV,
a processor coupled to the interferometer for calculating a Fourier transform of the output signals emerging from the interferometer, and
the processor measuring scene inhomgeneity based on the oscillating FOV.

21. The system of claim 20 wherein
a phase controller is coupled between the interferometer and the oscillator for controlling phase of the oscillating FOV.

* * * * *